June 14, 1949.　　　P. S. POTTS　　　2,473,259
DYNAMOELECTRIC MACHINE
Filed Jan. 9, 1946　　　　　　　　　　　2 Sheets-Sheet 1
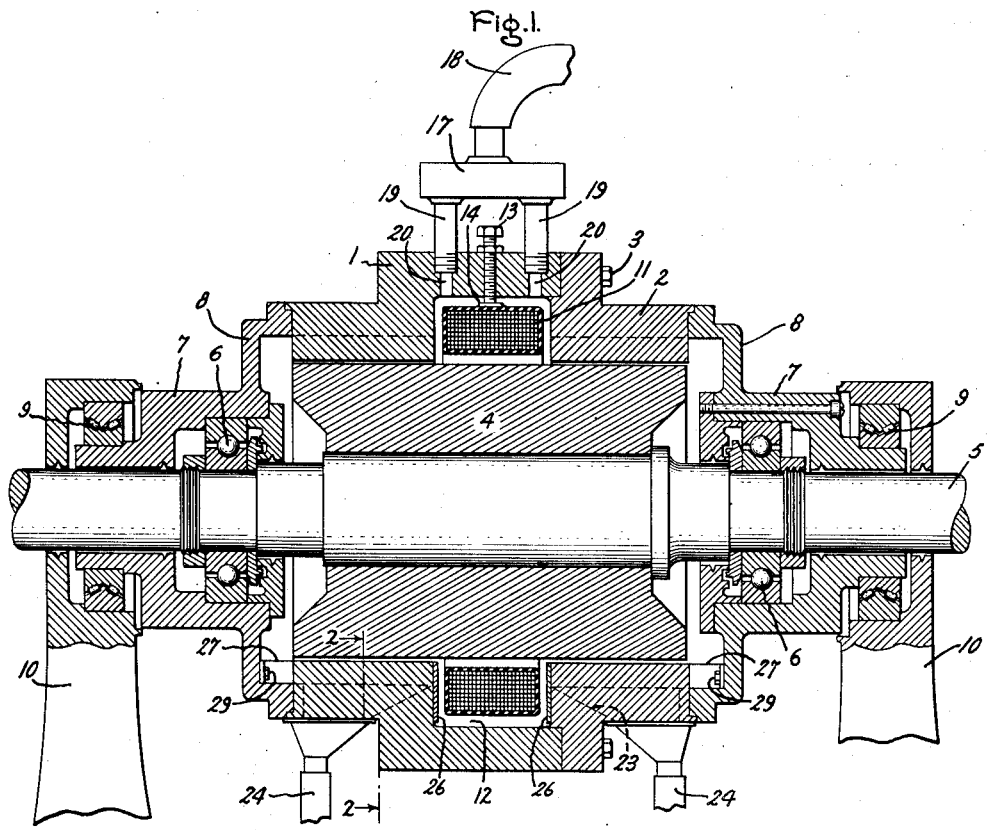
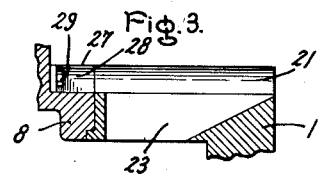
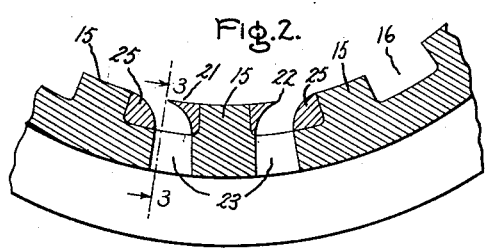
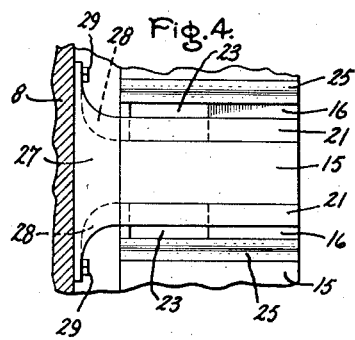
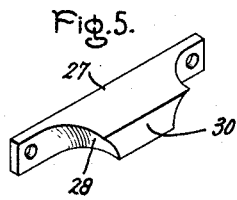
Inventor:
Phil S. Potts,
by Prowell S. Mack
His Attorney.

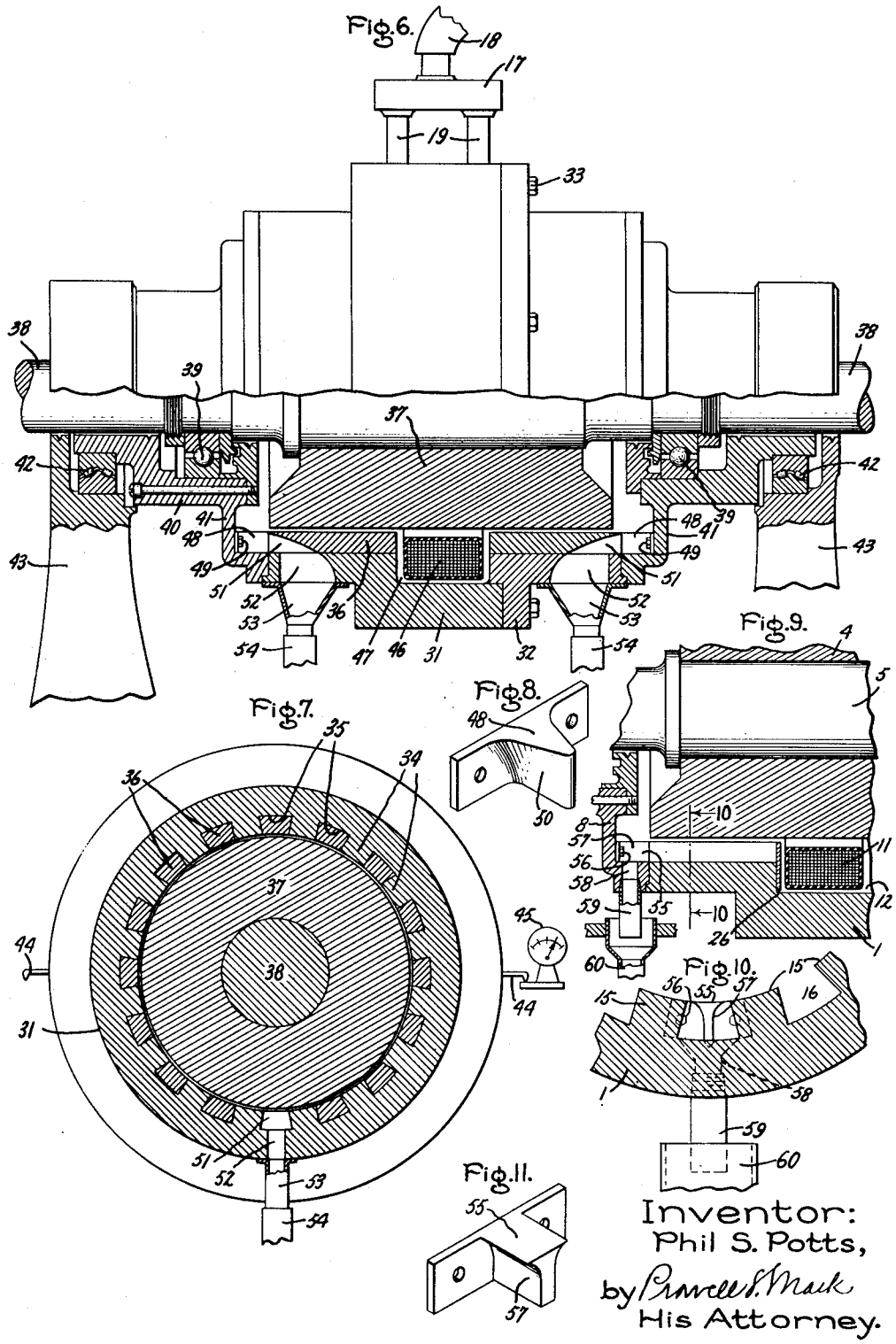

Patented June 14, 1949

2,473,259

UNITED STATES PATENT OFFICE 2,473,259

DYNAMOELECTRIC MACHINE

Phil S. Potts, Fort Wayne, Ind., assignor to General Electric Company, a corporation of New York Application January 9, 1946, Serial No. 639,987

11 Claims. (Cl. 188—104)

1

My invention relates to dynamoelectric machines and particularly to inductor eddy current types of machines which are adapted to be used as clutches, dynamometers, and brakes.

An object of my invention is to provide an improved dynamoelectric machine of the inductor type.

Another object of my invention is to provide an improved inductor type dynamoelectric machine which is adapted to absorb power and to be cooled by fluid supplied in direct contact with the eddy current surfaces thereof.

A further object of my invention is to provide an improved dynamoelectric machine of the inductor eddy current type in which a cooling fluid is supplied into direct contact with the eddy current surfaces of the machine and an arrangement is provided for minimizing the collection of cooling fluid in the end shields of the machine and directing such cooling fluid into drains, preferably in the lowermost slots of the stator from which it is then exhausted.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly in section of a dynamoelectric machine, particularly adapted to be used as a dynamometer, which is provided with an embodiment of my improved construction; Fig. 2 is an enlarged sectional view taken along line 2—2 of Fig. 1; Fig. 3 is a fragmentary sectional view taken along line 3—3 of Fig. 2; Fig. 4 is a plan view of the construction shown in Fig. 3; Fig. 5 is a perspective view of the end shield scoop shown in Figs. 1, 3, and 4; Fig. 6 is a side elevational view, partly in section, of a dynamoelectric machine provided with another embodiment of my invention; Fig. 7 is a sectional end view taken through the machine with the end shield removed and slightly in from either end shield; Fig. 8 is a perspective view of a water scoop such as that which is shown in Fig. 6; Fig. 9 is a fragmentary sectional elevational view through a dynamoelectric machine provided with another embodiment of my invention; Fig. 10 is a sectional view taken along line 10—10 of Fig. 9; and Fig. 11 is a perspective view of an end shield water scoop such as that shown in Fig. 9.

Referring to the drawings, I have shown in

2

Figs. 1 to 5, inclusive, one embodiment of my invention applied to a dynamoelectric machine construction in which a machine of the eddy current inductor type is constructed to be used preferably as a dynamometer or a brake. In this construction, the dynamoelectric machine is provided with a stationary member having two core sections 1 and 2 of magnetic material secured together in any suitable manner, as by bolts 3, and arranged about an inner relatively rotatable member having a core 4 of magnetic material mounted on a shaft 5 rotatably supported by suitable antifriction ball bearings 6 arranged in bearing housings formed by sleeves 7 on the stationary member end shields 8. The stationary member end shields 8 are adapted to support the stationary member core sections 1 and 2 for limited rotational movement by antifriction thrust roller bearings 9 mounted in suitable pedestals 10. A suitable field exciting winding 11 is mounted in a winding recess 12 formed in the stationary member between the core portions 1 and 2 for magnetically exciting the cores of the rotatable and stationary members of the machine. A plurality of circumferentially spaced apart mounting screws 13 extends through the stationary member core into engagement with mounting clips 14 for positioning and centering the field exciting winding 11 within the winding recess 12.

In this construction, energy is adapted to be absorbed by the machine by the generation of eddy currents in the outer substantially smooth cylindrical surface of the rotatable member core 4 resulting from the periodic variation of the flux linkages of any given portion of the surface of this core on rotation of this surface past a plurality of circumferentially spaced longitudinally extending teeth 15 formed in the inner air gap surface of the core of the stationary member with slots 16 formed therebetween to provide the desired variation in the flux linkages mentioned above. The eddy currents generated in the cylindrical surface of the rotatable member core 4 absorb the energy delivered to the machine by the shaft 5 and the passage of these eddy currents through the core 4 transforms this electrical energy into heat which must be dissipated. In order to remove this heat from the machine, cooling fluid, such as water, is supplied to the air gap of the machine between the stationary and rotatable member cores into direct heat transfer relationship with the surface of the rotatable member core 4, and in this construction is supplied through a header 17 which connects with a source of cooling fluid supply through a flexible hose connection 18 for minimizing the restraining effect of this connection on limited rotation of the stationary member of the machine. The cooling fluid passes from the supply header 17 through suitable pipe connections 19 into passages 20 in the core of the stationary member into the winding recess 12 in back of the field exciting winding 11 and flows around the winding 11, thereby cooling the winding, and then passes from this winding recess through a communication at the inner end thereof with the air gap between the two relatively rotatable members and into heat transfer contact with the outer peripheral surface of the rotatable member core 4, from which it flows longitudinally towards both ends of the machine. This cooling fluid absorbs the heat from the outer cylindrical surface of the core 4, and it is desirable that this cooling fluid should be removed from the surface of the core 4 when it has absorbed a desired amount of heat to prevent overheating of the machine and also to minimize hydraulic drag thereof which might result if the entire air gap should become filled with water. This removal of the heated cooling fluid is facilitated by the provision of longitudinally extending scoop members of nonmagnetic material extending outwardly towards the smooth cylindrical surface of the core 4 of the rotatable member and into adjacent slots 16 in the lowermost part of the machine. These scoops 21 are formed with curved sides and are narrower at the base section thereof than at the air gap surface, thereby forming outer longitudinal edges 22 which scrape or scoop fluid from the outer surface of the rotatable member core 4 as it rotates and directs the removed cooling fluid into the stator slots 16. This removed cooling fluid is adapted to be drained from the machine through suitable drain passages 23 which extend through the stationary member core and communicate with drain connections 24 which are connected to any suitable cooling fluid drains. In this construction, the cooling fluid is assisted in its flow into the lowermost slots 16 and the drain passages 23 by the provision of longitudinally extending transversely curved substantially smooth guiding surface members 25 of nonmagnetic material arranged in the slots 16 on the trailing sides of the teeth adjacent each of the scoop members 21 for guiding cooling fluid from the air gap into the slots 16 and the drain passages 23 for either direction of rotation of the rotatable member. The outer surface of these guiding members 25 is transversely curved to provide a curved outer slot surface extending from the air gap and of the tooth into the base of the slot. If only one set of these scoops and guiding surface members is provided, it is desirable that a tooth 15 should be the lowermost portion of the stationary member core in order to provide at least one scoop and one guiding surface member on each side of the lowermost tooth to provide for the scooping of cooling fluid from the rotatable member surface for either direction of rotation thereof. Baffles 26 are provided for closing off the lower slot ends adjacent the field exciting winding recess 12 to assure that the scooped off fluid flows out through the drain passages 23 rather than in the space around the field exciting winding 11. This longitudinal air gap scoop arrangement is not my invention but is the invention of Roland F. Hertel and is described and claimed in his copending application, Serial No. 638,374, filed December 29, 1945, now Patent Number 2,460,749, and assigned to the assignee of this application. With this construction, it has been found that the hydraulic gradient of the cooling fluid on the cylindrical surface of the rotatable member core 4 causes a certain amount of the cooling fluid to flow axially off both ends of the cooling member core into the space between the cores of the machine and the end shields 8 and to collect in this end shield space and rotate with the rotatable member without flowing directly out of the drain at the lowermost part of the machine, thereby causing a considerable amount of hydraulic drag which may produce erratic results in the measurement of the torque on the machine. I have found that the provision of end shield scoops 27 formed with inwardly and downwardly curved side surfaces 28 which provide scoops that are wider at the top than at the bottom and arranged in the lowermost part of the end shields 8 substantially opposite the tooth 15 provided with the slot scoops 21 provides for minimizing the turning of the cooling fluid with the rotatable members and for the drainage of this cooling fluid out of the end shield spaces and into the drains 27 from which it is removed from the machine. These end shield scoops 27 are preferably secured to the end shields 8 in any suitable manner, as by bolts 29, and formed with inner ends 30 which substantially conform in contours and dimensions to the ends of slot scoops 21 together with the tooth 15 on which the scoops 21 are mounted. The rate of flow of the cooling fluid may be regulated as desired responsive to various characteristics of the machine, such as the amount of cooling fluid which may adhere to the cylindrical surface of the rotatable member 4 or in accordance with the rate at which the cooling fluid may be removed from the machine or with the temperature of the exhausted cooling fluid or any other desired characteristic as is conventionally incorporated in the cooling systems of this type of machine.

In Figs. 6, 7, and 8, I have shown another embodiment of my invention applied to a dynamoelectric machine which is preferably adapted to be used as a dynamometer or a brake in which the stationary member of the machine is made of two core sections 31 and 32 secured together by any suitable means such as bolts 33 arranged in circumferentially spaced relation and provided with a plurality of longitudinally extending circumferentially spaced teeth 34 in the inner peripheral air gap surface of the stationary member core sections 31 and 32. Substantially all of the slots 35 formed between the stationary member core teeth 34 are filled with nonmagnetic material 36 in order to provide a substantially smooth cylindrical peripheral air gap surface to this member of the machine. A rotatable member is provided which is adapted to react electrodynamically with the stationary member of the machine and includes a core 37 of magnetic material having a substantially smooth cylindrical peripheral surface spaced from the inner peripheral surface of the stationary member core by a small air gap. This core 37 is mounted on a shaft 38 which is rotatably supported by antifriction ball bearings 39 mounted in a bearing housing formed by sleeves 40 which extend from stationary member end shields 41. These stationary member end shields 41 are secured to the stationary member core sections and are rotatably supported by antifriction thrust roller bearings 42 suitably mounted in pedestals 43 which support the relatively stationary member of the machine for a limited amount of rotational movement, such that the torque thereon may be transmitted through suitable torque arms 44 to any suitable force measuring device 45. The cores of the rotatable and stationary members of the machine are magnetically excited by a suitable field exciting winding 46 which is mounted in a winding recess 47 formed between the two parts of the stationary member core. Energization of the field exciting winding when the rotatable member 37 is rotated causes eddy currents to be generated in the air gap surface of the rotatable member core due to the flux variations as this surface of the rotatable member core passes the stationary member core teeth 34, and these eddy currents absorb energy which is transmitted to the machine through the shaft 38 and transform this energy into heat which raises the temperature of the machine. In order to dissipate this heat energy, cooling fluid is admitted into the machine through a cooling fluid header 17 which may be connected to a suitable source of cooling fluid supply, such as a source of water, by a flexible hose 18 which will minimize the restraint on the rotation of the stationary member by this connection in the same manner as the construction shown in Fig. 1. As in Fig. 1, the water passes from the water header 17 through connecting pipes 19 and through the stationary member cores into the winding recess 47 around the field exciting winding 46 and from a communication of this winding recess with the air gap into the air gap and flows towards both ends of the machine. In this construction, no provision is made for scooping the cooling fluid from the surface of the rotatable member core 37, and all of the cooling fluid passes axially into the end shield space at both ends of the machine. It has been found that this cooling fluid tends to rotate with the rotatable member and may provide an undesirable drag and erratic action of the machine. In order to eliminate these undesirable features, I provide end shield scoops 48 which are preferably mounted directly on the end shields 41 by suitable bolts 49 and are formed with downwardly and outwardly curved tapered side surfaces 50 which are arranged to direct the cooling fluid from the end shield space into drain passages 51 formed in at least one of the lowermost slots of the machine through the non-magnetic filler material in such slots. The cooling fluid is adapted to pass from the drain passages 51 into drain openings 52 formed through the stationary member cores 31 and 32 from which it empties into drain connections 53 and passes into suitable drains 54 which are constructed so as to minimize restraint on the rotation of the stationary member of the machine. With this construction, the water passes from the rotatable member surface into the end shield space and is redirected as it reaches the lower portion of the end shield, from which it drains outwardly, as explained above, without producing any appreciable drag on the machine.

In Figs. 9, 10, and 11, I have shown another embodiment of my invention, in which the stationary and rotatable members of the machine are formed substantially the same as those shown in Fig. 1 in which the stationary member is provided with a core of magnetic material having members 1 and 2, as shown in Fig. 1, and the rotatable member is formed with a core 4 of magnetic material which is mounted on a shaft 5 suitably supported in bearings which may be made similar to those shown in Figs. 1 and 6. Magnetic excitation of the machine is provided by a field exciting winding 11 arranged in a winding recess 12 and the stationary member is formed with a plurality of longitudinally extending circumferentially spaced apart teeth 15 with slots 16 therebetween. In this construction, slot scoops may be provided which extend longitudinally in the lowermost slot or slots of the machine similar to the construction disclosed and claimed in co-pending application, Serial No. 638,374, filed December 29, 1945, now Patent Number 2,460,749, by R. F. Hertel, and assigned to the assignee of this application. These slot scoops do not form a part of this invention and may be omitted from the construction if desired. In the arrangement shown specifically in Figs. 9 and 10, these slot scoops have not been included. In this machine, the cooling fluid is adapted to be supplied as in the construction shown in Fig. 1 in order to cool the field exciting winding 11 and then passes into heat transfer contact with the outer peripheral surface of the rotatable member core 4 and longitudinally into the spaces within the end shields 8 of the machine. As in the other construction, this cooling fluid will tend to rotate with the rotatable member core 4 and may produce undesirable drag and erratic action of the machine. In order to eliminate or minimize these effects, I provide end shield scoops 55 which are preferably mounted in the end shields 8 of the machine in any suitable manner, as by bolts 56. These end shield scoops are formed with downwardly curved side surfaces 57 which are adapted to stop the rotation of the cooling fluid in the end shield and to redirect this cooling fluid into drain passages 58 formed through the end shields 8 and into drain connections 59 which may extend into the enlarged ends of a suitable drain 60 which permits a limited amount of rotational movement of the drain connection 59 without interference of the drain with such movement of the stationary member of the machine. As in the construction shown in Fig. 1, baffles 26 are arranged on the inner winding recess end of the slot 16 in order to minimize the passage of cooling fluid through the slot 16 into the winding recess. These baffles 26 preferably extend only for a small distance on both sides of the lowermost part of the machine, as water will not interfere greatly with the operation of the machine if it passes into these slots above the lowermost portion of the machine, and these baffles 26 function principally to minimize the passage of the heated water through the slots 16 into the recess 12 due to the collecting action of the end shield scoops 55.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a relatively stationary member with a core of magnetic material and a relatively rotatable member with a core of magnetic material arranged with an air gap between said cores, means including a field exciting winding for magnetically exciting said cores, longitudinally extending teeth with slots therebetween in the inner peripheral surface of the magnetic material of said stationary member core, means for supplying cooling fluid into said air gap onto said rotatable member for passage to the ends of the machine, means including an end shield on each end of said stationary member for substantially preventing passage of cooling fluid out of the ends of the machine, means including drain passages for draining cooling fluid from the lower part of said machine, and means including a fluid scoop member having curved sides wider at the top than at the base and arranged in spaces between each of said end shields and said stationary member core and substantially at the height of said teeth for guiding cooling fluid from said end shield into said drain passages.

2. A dynamoelectric machine having a relatively stationary member with a core of magnetic material and a relatively rotatable member with a core of magnetic material having a relatively smooth substantially cylindrical outer surface arranged with an air gap between said cores, means including a field exciting winding for magnetically exciting said cores, longitudinally extending teeth with slots therebetween in the inner peripheral surface of the magnetic material of said stationary member core, means for supplying cooling fluid into said air gap onto said cylindrical surface of said rotatable member, means including an end shield on each end of said stationary member for substantially preventing passage of cooling fluid out of the ends of the machine, means including a fluid scoop member having sides wider adjacent said end shield than adjacent said stationary member core and arranged in spaces between each of said end shields and said stationary member core opposite one of said teeth in the lower part of said machine on each end thereof for guiding cooling fluid from said end shield into one of said slots, and means including drain passages extending into communication with said slots for draining cooling fluid therefrom.

3. A dynamoelectric machine having a relatively stationary member with a core of magnetic material and a relatively rotatable member with a core of magnetic material having a relatively smooth substantially cylindrical outer surface arranged with an air gap between said cores, means including a field exciting winding for magnetically exciting said cores, longitudinally extending teeth with slots therebetween in the inner peripheral surface of the magnetic material of said stationary member core, means for supplying cooling fluid into said air gap onto said cylindrical surface of said rotatable member, means including an end shield on each end of said stationary member for substantially preventing passage of cooling fluid out of the ends of the machine, means including a fluid scoop member having sides wider adjacent said end shield than adjacent said stationary member core and arranged in spaces between each of said end shields and said stationary member core opposite substantially the center of one of said slots in the lower part of said machine on each end thereof for guiding cooling fluid from said end shield into said latter slots, and means including drain passages extending into communication with said slots for draining cooling fluid therefrom.

4. A dynamoelectric machine having a relatively stationary member with a core of magnetic material and a relatively rotatable member with a core of magnetic material having a relatively smooth substantially cylindrical outer surface arranged with an air gap between said cores, means including a field exciting winding for magnetically exciting said cores, longitudinally extending teeth with slots therebetween in the inner peripheral surface of the magnetic material of said stationary member core, nonmagnetic means for substantially filling said slots providing a substantially smooth cylindrical surface to said toothed core, means for supplying cooling fluid for passage around said field exciting winding and into said air gap onto said cylindrical surface of said rotatable member, means including an end shield on each end of said stationary member, means including a fluid scoop member arranged in each of said end shields adjacent an end of one of said slots in the lower part of said machine on each end thereof for guiding cooling fluid from said end shield into passages in said slot filling means in said latter slots, and means including drain passages extending into communication with said latter slots for draining cooling fluid therefrom.

5. A dynamoelectric machine having a relatively stationary member with a core of magnetic material and a relatively rotatable member with a core of magnetic material arranged with an air gap between said cores, means including a field exciting winding for magnetically exciting said cores, longitudinally extending teeth with slots therebetween in the inner peripheral surface of the magnetic material of said stationary member core, means for supplying cooling fluid into said air gap onto said rotatable member, means including an end shield on each end of said stationary member for substantially preventing passage of cooling fluid out of the ends of the machine, means including a fluid scoop member having curved sides wider at the top than at the base and arranged in spaces between each of said end shields and said stationary member core and substantially at the height of said teeth and each arranged opposite substantially the center of one of said slots in the lower part of said machine on each end thereof for guiding cooling fluid from said end shield into said latter slots, and means including drain passages extending into communication with said slots for draining cooling fluid therefrom.

6. A dynamoelectric machine having a relatively stationary member with a core of magnetic material and a relatively rotatable member with a core of magnetic material having a relatively smooth substantially cylindrical outer surface arranged with an air gap between said cores, means including a field exciting winding for magnetically exciting said cores, longitudinally extending teeth with slots therebetween in the inner peripheral surface of the magnetic material of said stationary member core, nonmagnetic means for substantially filling said slots providing a substantially smooth cylindrical surface to said toothed core, means for supplying cooling fluid into said air gap onto said cylindrical surface of said rotatable member, means including an end shield on each end of said stationary member, means including a fluid scoop member arranged in spaces between each of said end shields and said stationary member core opposite substantially the center of one of said slots in the lower part of said machine on each end thereof for guiding cooling fluid from said end shield into passages in said slot filling means in said latter slots, and means including drain passages extending into communication with said latter slots for draining cooling fluid therefrom.

7. A dynamoelectric machine having a relatively stationary member with a core of magnetic material and a relatively rotatable member with a core of magnetic material with an air gap between said cores, means for magnetically exciting said cores, longitudinally extending teeth with slots therebetween in the inner peripheral surface of the magnetic material of said stationary member core, means for supplying cooling fluid into said air gap onto said surface of said rotatable member, means including longitudinally extending slot scoop members of nonmagnetic material mounted in slots in the lower part of said stationary member and having curved sides with outer longitudinal edges extending towards the adjacent teeth for removal of excess fluid from said rotatable member core air gap surface and for directing such removed cooling fluid into said latter slots, an end shield on each end of said stationary member, means including a fluid scoop member on each end of said machine having sides curved downwardly wider at the top than at the base and outwardly wider adjacent said end shields than said core and arranged in spaces between the lower part of said end shields and said stationary member core and adjacent the ends of said slot scoop members in the lower part of said machine for guiding cooling fluid from said end shields into said latter slots, and means for draining cooling fluid from said latter slots.

8. A dynamoelectric machine having a relatively stationary member with a core of magnetic material and a relatively rotatable member with a core of magnetic material with an air gap between said cores, means for magnetically exciting said cores, longitudinally extending teeth with slots therebetween in the inner peripheral surface of the magnetic material of said stationary member core, means for supplying cooling fluid into said air gap onto said surface of said rotatable member, means including at least one longitudinally extending slot scoop member of nonmagnetic material mounted in a slot in the lower part of said stationary member and having a curved side with an outer longitudinal edge extending towards the adjacent tooth for removal of excess fluid from said rotatable member core air gap surface and for directing such removed cooling fluid into said latter slot, an end shield on each end of said stationary member, means including a fluid scoop member on each end of said machine having curved sides wider at the top than at the base and arranged in spaces between the lower part of said end shields and said stationary member core and adjacent the ends of said slot scoop member in the lower part of said machine for guiding cooling fluid from said end shields into said latter slot, and means for draining cooling fluid from said latter slot.

9. A dynamoelectric machine having a relatively stationary member with a core of magnetic material and a relatively rotatable member with a core of magnetic material with an air gap between said cores, means for magnetically exciting said cores, longitudinally extending teeth with slots therebetween in the inner peripheral surface of the magnetic material of said stationary member core, means for supplying cooling fluid into said air gap onto said rotatable member, means including at least one longitudinally extending slot scoop member of nonmagnetic material mounted in a slot on each side of said machine adjacent the lower part of said stationary member and having curved sides with outer longitudinal edges extending towards the adjacent teeth and a narrower base section for removal of fluid from said air gap and for directing such removed cooling fluid into said latter slot, means including an end shield on each end of said stationary member for substantially preventing passage of cooling fluid out of the ends of the machine, means including a fluid scoop member on each end of said machine having curved sides wider at the top than at the base and wider adjacent said end shield than adjacent said stationary member core and arranged in spaces between said end shields and said stationary member core and extending from said slot scoop member in the lower part of said machine for guiding cooling fluid from said end shields into said latter slot, and means for draining cooling fluid from said latter slot.

10. A dynamoelectric machine having a relatively stationary outer member with a core of magnetic material and a relatively rotatable inner member with a core of magnetic material having a relatively smooth substantially cylindrical outer surface arranged with an air gap between said cores, means including a field exciting winding for magnetically exciting said cores, means for rotatably supporting said rotatable inner member, means for rotatably supporting said outer member, means for measuring the torque on said outer member, longitudinally extending teeth with slots therebetween in the inner peripheral surface of the magnetic material of said outer member core, means for supplying cooling fluid into said air gap onto said smooth cylindrical surface of said rotatable inner member, means including an enclosing end shield on each end of said stationary member for substantially preventing passage of cooling fluid out of the ends of the machine, means including a fluid scoop member having curved sides wider at the top than at the base and wider adjacent said end shield than adjacent said stationary member core and arranged in spaces between said end shields and said stationary member core and substantially the height of said teeth and arranged opposite one of said slots in the lowermost part of said machine for guiding cooling fluid from said end shield into said latter slot, and means including a drain passage extending into communication with said latter slot for draining cooling fluid therefrom.

11. A dynamoelectric machine having a relatively stationary outer member with a core of magnetic material and a relatively rotatable inner member with a core of magnetic material having a relatively smooth substantially cylindrical outer surface arranged with an air gap between said cores, means including a field exciting winding for magnetically exciting said cores, means for rotatably supporting said inner member, means for rotatably supporting said outer member, means for measuring the torque on said outer member, longitudinally extending teeth with slots therebetween in the inner peripheral surface of the magnetic material of said outer member core, means for supplying cooling fluid into said air gap onto said smooth cylindrical surface of said rotatable inner member, means including at least one longitudinally extending slot scoop member of nonmagnetic material mounted in a slot on each side of said machine adjacent the lowermost part of said outer member and having curved sides with outer longitudinal edges extending towards the adjacent teeth and with a narrower base section for removal of excess fluid from said rotatable member cylindrical surface and for directing such removed cooling fluid into said slots, means including an enclosing end shield on each end of said stationary member for substantially preventing passage of cooling fluid out of the ends of the machine, means including a fluid scoop member on each side of said machine having curved sides wider at the top than at the base and wider adjacent said end shield than adjacent said stationary member core and arranged in spaces between said end shields and said stationary member core substantially the height of said teeth and extending from said slot scoop member in the lowermost part of said machine for guiding cooling fluid from said end shields into said latter slots, and means including drain passages extending into said slots for draining cooling fluid therefrom.

PHIL S. POTTS.

REFERENCES CITED

The following references are of record in the file of this patent:

UNITED STATES PATENTS

| Number    | Name    | Date          |
|-----------|---------|---------------|
| 2,351,963 | Hayes   | Jan. 20, 1944 |
| 2,367,163 | Winther | Jan. 9, 1945  |